US011474292B2

(12) United States Patent
Mukasa (10) Patent No.: US 11,474,292 B2
(45) Date of Patent: Oct. 18, 2022

(54) MULTI-CORE FIBERS AND METHOD OF MANUFACTURING THE SAME, AND OPTICAL TRANSMISSION SYSTEM AND OPTICAL TRANSMISSION METHOD

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/986,743

(22) Filed: Aug. 6, 2020

(65) Prior Publication Data

US 2020/0379168 A1    Dec. 3, 2020

Related U.S. Application Data

(63) Continuation of application No. PCT/JP2019/007639, filed on Feb. 27, 2019.

(30) Foreign Application Priority Data

Feb. 28, 2018   (JP) .............................. JP2018-034619

(51) Int. Cl.
*G02B 6/02* (2006.01)
*H04B 10/25* (2013.01)
(Continued)

(52) U.S. Cl.
CPC .... *G02B 6/02042* (2013.01); *C03B 37/01214* (2013.01); *C03B 37/027* (2013.01);
(Continued)

(58) Field of Classification Search
CPC .... G02B 6/02042; G02B 6/02; G02B 6/4246; C03B 37/01214; C03B 37/027; C03B 2203/40; H04B 10/25891
(Continued)

(56) References Cited

U.S. PATENT DOCUMENTS 4,478,488 A * 10/1984 Bagley ................. G02B 6/4401
                                                       385/104
5,785,729 A     7/1998 Yokokawa et al.
(Continued)

FOREIGN PATENT DOCUMENTS

EP     2 806 297 A1   11/2014
JP     07-109141 A     4/1995
(Continued)

OTHER PUBLICATIONS

International Search Report dated May 28, 2019 in PCT/JP2019/007639 filed on Feb. 27, 2019, 2 pages.
(Continued)

*Primary Examiner* — Abbas H Alagheband
(74) *Attorney, Agent, or Firm* — Oblon, McClelland, Maier & Neustadt, L.L.P.

(57) ABSTRACT

A multi-core fiber includes: a plurality of cores; and a cladding portion formed around outer peripheries of the cores. Further, the cores each have a propagation characteristic conforming to any one of a plurality of standards for optical propagation characteristics, and of the cores, cores that are closest to each other conform to standards different from each other.

11 Claims, 8 Drawing Sheets

(51) Int. Cl.
| | |
|---|---|
| *C03B 37/012* | (2006.01) |
| *C03B 37/027* | (2006.01) |
| *G02B 6/42* | (2006.01) |
| *H04B 10/50* | (2013.01) |
| *H04B 10/60* | (2013.01) |
| *H04J 14/02* | (2006.01) |

(52) U.S. Cl.
CPC ..... *G02B 6/4246* (2013.01); *H04B 10/25891* (2020.05); *H04B 10/50* (2013.01); *H04B 10/60* (2013.01); *H04J 14/02* (2013.01)

(58) Field of Classification Search
USPC .......................................................... 398/79
See application file for complete search history.

(56) References Cited

U.S. PATENT DOCUMENTS

| | | | | |
|---|---|---|---|---|
| 6,154,594 | A * | 11/2000 | Fiacco | G02B 6/02042 385/126 |
| 6,611,648 | B2 * | 8/2003 | Kumar | G02B 6/02042 385/126 |
| 8,285,094 | B2 | 10/2012 | Takenaga et al. | |
| 9,081,129 | B2 * | 7/2015 | Matsuo | G02B 6/0365 |
| 9,121,993 | B2 * | 9/2015 | Imamura | H04J 14/04 |
| 9,335,467 | B2 | 5/2016 | Kokubun et al. | |
| 2009/0180743 | A1 * | 7/2009 | Althaus | H04B 10/2589 385/101 |
| 2009/0324242 | A1 * | 12/2009 | Imamura | G02B 6/02347 398/142 |
| 2010/0189397 | A1 * | 7/2010 | Richard | G02B 6/02366 385/123 |
| 2011/0274435 | A1 * | 11/2011 | Fini | H04J 14/025 398/139 |
| 2012/0195563 | A1 * | 8/2012 | Takenaga | G02B 6/02042 385/126 |
| 2012/0315006 | A1 * | 12/2012 | Bigot-Astruc | G02B 6/03661 427/163.2 |
| 2013/0302002 | A1 * | 11/2013 | Imamura | G02B 6/02042 385/127 |
| 2014/0216109 | A1 * | 8/2014 | Ishida | C03B 37/02754 65/409 |
| 2014/0334789 | A1 * | 11/2014 | Matsuo | G02B 6/02042 385/126 |
| 2015/0043878 | A1 * | 2/2015 | Chen | B29D 11/00663 264/1.24 |
| 2015/0078744 | A1 * | 3/2015 | Ito | H04B 10/2581 398/43 |
| 2015/0316715 | A1 * | 11/2015 | Matsuo | G02B 6/0365 385/124 |
| 2016/0004009 | A1 * | 1/2016 | Takenaga | G02B 6/03605 385/126 |
| 2016/0018277 | A1 * | 1/2016 | Challener | G02B 6/02328 356/73.1 |
| 2016/0043826 | A1 * | 2/2016 | Zhou | H04J 14/02 398/44 |
| 2016/0380838 | A1 * | 12/2016 | Spock | H04Q 11/0005 398/45 |
| 2017/0205575 | A1 * | 7/2017 | Ishida | C03B 37/027 |
| 2019/0072712 | A1 * | 3/2019 | Takenaga | G02B 6/02042 |

FOREIGN PATENT DOCUMENTS

| | | |
|---|---|---|
| JP | 2013-092801 A | 5/2013 |
| JP | 2013-167861 A | 8/2013 |
| JP | 2013-212955 A | 10/2013 |
| JP | 2017-075061 A | 4/2017 |
| WO | 02/090275 A2 | 11/2002 |
| WO | WO 2013/027776 A1 | 2/2013 |

OTHER PUBLICATIONS

Gonda et al., "125μm 5-core fibre with heterogeneous design suitable for migration from single-core system to multi-core system", 42$^{nd}$ European Conference and Exhibition on Optical Communications (ECOC 2016), Sep. 18, 2016, pp. 547-549.

Gonda et al., "Design of Multicore Fiber Having Upgradability From Standard Single-Mode Fibersand Its Application", Journal of Lightwave Technology, vol. 37, No. 2, Jan. 15, 2019, pp. 396-403.

Amma et al., "High-Density Multicore Fiber with Heterogeneous Core Arrangement", OFC 2015, paper Th4C.4, Summary, 2015, 3 pages.

Extended European search report dated Sep. 29, 2021 in European patent application No. 19760218.8, 8 pages.

* cited by examiner

MULTI-CORE FIBERS AND METHOD OF MANUFACTURING THE SAME, AND OPTICAL TRANSMISSION SYSTEM AND OPTICAL TRANSMISSION METHOD

CROSS-REFERENCE TO RELATED APPLICATION(S)

This application is a continuation of International Application No. PCT/JP2019/007639, filed on Feb. 27, 2019 which claims the benefit of priority of the prior Japanese Patent Application No. 2018-034619, filed on Feb. 28, 2018, the entire contents of which are incorporated herein by reference.

BACKGROUND

The present disclosure relates to multi-core fibers and a method of manufacturing the same, and an optical transmission system and an optical transmission method.

In the related art, studies have been conducted actively in order to increase the number of space division multiplexing and the space density by using heterogeneous cores having propagation refractive indexes different from each other in a multi-core fiber (Patent International publication No. WO 2013/027776 and Y. Amina et al., "High-density Multi-core Fiber with Heterogeneous Core Arrangement" OFC 2015, paper Th4C.4, (2015)). For example, Y. Amma et al., "High-density Multi-core Fiber with Heterogeneous Core Arrangement" OFC 2015, paper Th4C.4, (2015) has reported the result of arranging 30 cores in a cladding portion having an outside diameter of 228 min at a high density.

SUMMARY

There is a need for providing multi-core fibers that are versatile and the space density of which can be increased, and a method of manufacturing the same, as well as an optical transmission system and an optical transmission method.

According to an embodiment, a multi-core fiber includes: a plurality of cores; and a cladding portion formed around outer peripheries of the cores. Further, the cores each have a propagation characteristic conforming to any one of a plurality of standards for optical propagation characteristics, and of the cores, cores that are closest to each other conform to standards different from each other.

According to an embodiment, a method of manufacturing a multi-core fiber includes: preparing a plurality of core preforms for fabricating a core that has a propagation characteristic conforming to any one of a plurality of standards for optical propagation characteristics, the core preforms conforming to standards different from each other; fabricating an optical fiber preform by using the core preforms; and fabricating a multi-core fiber by drawing the optical fiber preform.

DETAILED DESCRIPTION

For optical fibers, standards are defined on optical propagation characteristics and other characteristics. For example, ITU-T (the International Telecommunication Union's Telecommunication Standardization Sector) Recommendations are standards that are widely accepted in the world.

Bringing the multi-core fiber that uses heterogeneous cores (hereinafter referred to as a heterogeneous multi-core fiber, as appropriate) into conformity with the standards increases the versatility of use thereof, which is preferable in actual use. However, conformity of the heterogeneous multi-core fiber to the standards has not necessarily been considered sufficiently thus far.

Embodiments of the present disclosure will be described in detail below with reference to the drawings. The embodiments to be described below do not limit the present disclosure. In the drawings, the same reference sign is given to the same or corresponding components, as appropriate. In the present specification, cut-off wavelength refers to cable cut-off wavelength defined in ITU-T G.650.1. Note that Other terms that are not defined in particular in the present specification are to be pursuant to the definitions and measurement methods in ITU-T G.650.1.

The inventor has earnestly considered an increase in space density of a heterogeneous multi-core fiber and conformity to standards. As a result, the following has been found: if all heterogeneous cores are designed under the condition of being in conformity with a standard, a sufficient difference in propagation refractive index cannot be set between the heterogeneous cores, and trying to keep crosstalk of light within tolerance adds constraints to the increase in space density.

Consequently, the inventor has conceived of a plurality of cores being such that each have propagation characteristics conforming to any one of a plurality of standards for optical propagation characteristics, and also, cores that are closest to each other conforming to standards different from each other, as a result of earnest consideration. In this manner, heterogeneous cores can be made to adjoin each other that have a sufficient difference in propagation refractive index therebetween, and that, at the same time, all conform to standards, so that a multi core fiber can be implemented that is versatile and the space density of which can be increased.

First Embodiment

Figure 1:
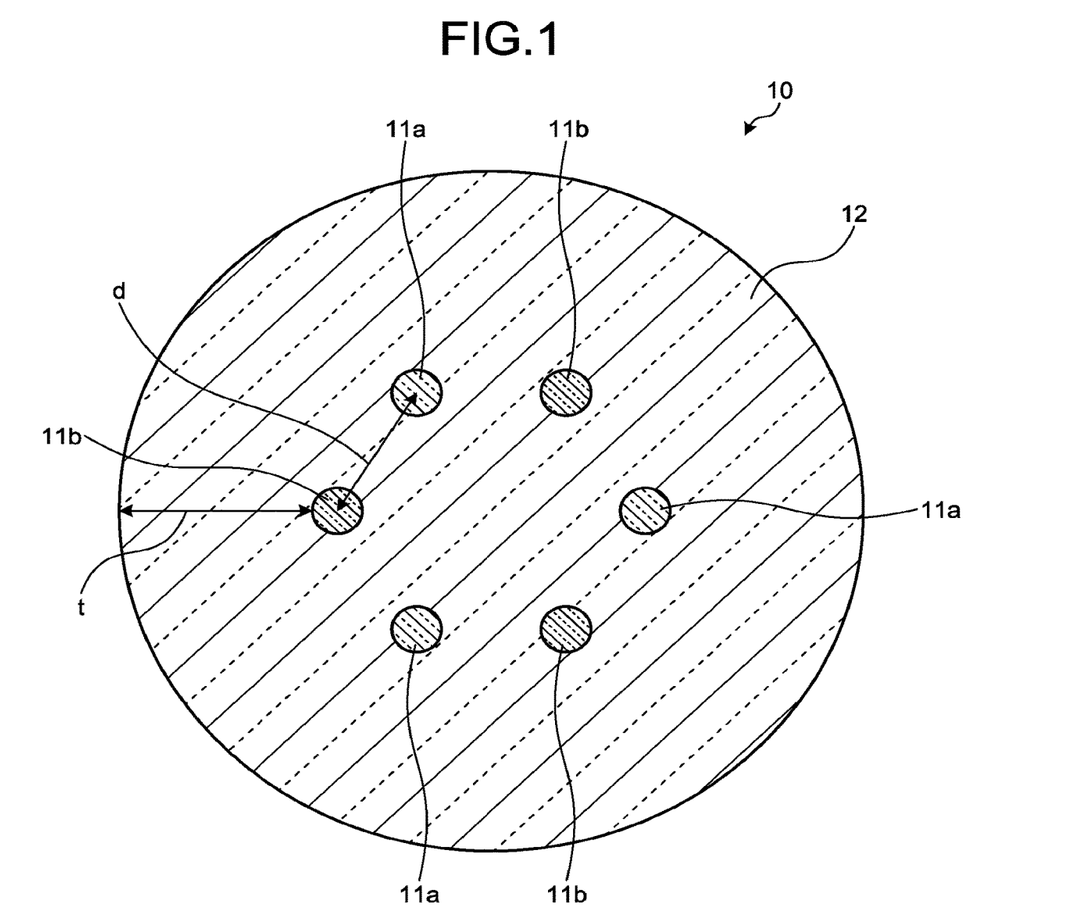
FIG. 1 is a schematic cross-sectional diagram of a multi-core fiber according to a first embodiment.

FIG. 1 is a schematic cross-sectional diagram perpendicular to the longitudinal direction of a multi-core fiber according to a first embodiment. A multi-core fiber 10 includes, as a plurality of, specifically, six cores, three cores 11*a* and three cores 11b. The multi-core fiber 10 also includes a cladding portion 12 formed around the outer peripheries of the cores 11a, 11b.

The cores 11a, 11b and the cladding portion 12 are both made of silica glass. The cladding portion 12 has a refractive index lower than the maximum refractive index of the cores 11a, 11b. For example, the cores 11a, 11b are made of silica glass with which germanium (Ge) or the like, which is dopant for increasing the refractive index, is doped. Meanwhile, the cladding portion 12 is made of pure silica glass that includes no dopant for adjusting the refractive index, for example.

The cores 11a, 11b are arranged alternately around the central axis of the cladding portion 12, and are regular hexagonal in form. This arrangement can be said to be such that cores are arranged at lattice points except for the center in a hexagonal closest packing lattice. If the cores 11a, 11b are thus arranged in a hexagonal closest packing lattice, it is easy to manufacture fan-in and fan-out that are types of optical input unit and optical output unit that inputs/outputs light to/from the cores of the multi-core fiber.

In this arrangement, cores closest to a core 11a are the adjacent two cores 11b, and cores closest to a core 11b are the adjacent two cores 11a. The distances (pitches) between these closest cores are all d. The pitch between cores 11a and the pitch between cores 11b are both √3×d.

The cores 11a, 11b have propagation characteristics conforming to any one of a plurality of standards for optical propagation characteristics. Specifically, the cores 11a have propagation characteristics conforming to G.652 standard or G.657A standard. The cores 11b have propagation characteristics conforming to G.654 standard.

As shown in Table 1, G.652 standard includes G.652A standard and G.652B standard, and G.657A standard includes G.657A1 standard and G.6527A2 standard. As shown in Table 2, G.654 standard includes G.654A standard, G.654B standard, G.6545 standard, and G.654D standard. Each standard defines optical propagation characteristics. Herein, optical propagation characteristics refer to the mode field diameter (MFD) at a specific wavelength (1310 nm or 1550 nm), the cable cut-off wavelength (λcc), the macrobending loss, chromatic dispersion characteristics (the chromatic dispersion at a specific wavelength (1550 nm), the zero-dispersion wavelength, or the dispersion slope at the zero-dispersion wavelength). The macrobending loss is specified by an increment in transmission loss for the specific number of turns or an increment in transmission loss per unit length at a specific wavelength (1550 nm or 1625 nm) and at a specific bend radius (30 mm or 10 mm). In Table 2, "A/C" indicates G.654A standard and G.654C standard. In other words, G.654A standard and G.6545 standard define common standards for the propagation characteristics shown in Table 2.

TABLE 1

| Item | Unit | G.652 standard | | G.657 standard | |
| --- | --- | --- | --- | --- | --- |
| | | A | B | A1 | A2 |
| MFD @ 1310 nm | μm | 8.6-9.5 | 8.6-9.5 | 8.6-9.2 | 8.6-9.2 |
| λcc | nm | ≤1260 | ≤1260 | ≤1260 | ≤1260 |
| Macro bending loss | dB (dB/m) | ≤0.1/100 turns (≤0.0053) @ 30 mm @ 1550 nm | ≤0.1/100 turns (≤0.0053) @ 30 mm @ 1625 nm | ≤0.75/1 turns (≤11.94) @ 10 mm @ 1550 nm | ≤0.1/10 turns (≤1.59) @ 10 mm @ 1550 nm |
| Zero-dispersion wavelength | nm | 1300-1324 | 1300-1324 | 1300-1324 | 1300-1324 |
| Dispersion slope | ps/nm²/km | ≤0.092 | ≤0.092 | ≤0.092 | ≤0.092 |

TABLE 2

| Item | Unit | G.654 standard | | |
| --- | --- | --- | --- | --- |
| | | A/C | B | D |
| MFD @ 1550 nm | μm | 9.5-10.5 | 9.5-13.0 | 11.5-15.0 |
| λcc | nm | ≤1530 | ≤1530 | ≤1530 |
| Macrobending loss | dB/100 turn (dB/m) | ≤0.5 (≤0.0265) @ 30 mm @ 1625 nm | ≤0.5 (≤0.0265) @ 30 mm @ 1625 nm | ≤2.0 (≤0.106) @ 30 mm @ 1625 nm |
| Chromatic dispersion @ 1550 nm | ps/nm/km | ≤20 | ≤22 | ≤23 |
| Dispersion slope | ps/nm²/km | ≤0.070 | ≤0.070 | ≤0.070 |

In the first embodiment, all the cores 11a conform to the propagation characteristics of G.652A standard shown in Table 1, and all the cores 11b conform to the propagation characteristics of G.654A standard shown in Table 1. This enables each of the cores 11a, 11b to be versatile conforming to the standards. Furthermore, the cores 11a, 11b that are closest to each other conform to standards different from each other. This enables the cores 11a, 11b to have refractive index profiles different from each other. As a result, a difference in propagation refractive index can be set sufficiently between the cores 11a, 11b, so that the pitch can be decreased and the space density can be increased.

For the cores 11a, 11b and the cladding portion 12, refractive index profiles are set so as to achieve conformity to these standards. The refractive index profiles to be set are not particularly limited. However, step-index type and trench-index type, for example, have commonly been used and are preferable in terms of manufacturability and design.

Figure 2:
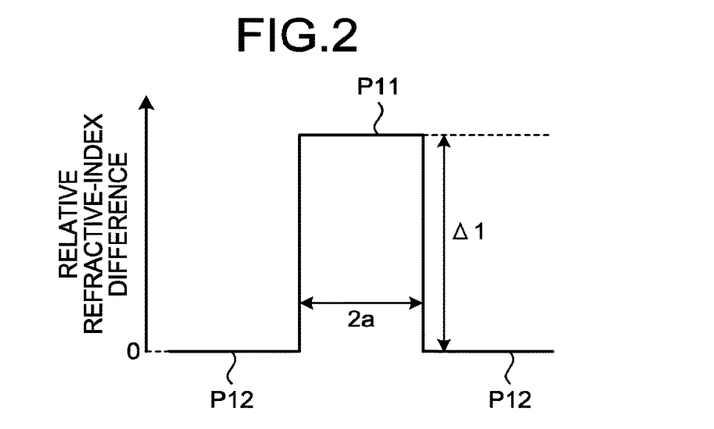
FIG. 2 is a view illustrating a step-index profile that is an example of a refractive index profile.

FIG. 2 is a view illustrating a step-index refractive index profile in the radial direction from the central axes of the cores. In FIG. 2, a profile P11 illustrates the refractive index profile of the cores 11a or the cores 11b, and a profile P12 illustrates the refractive index profile of the cladding portion 12. The refractive index profiles are indicated by relative refractive-index differences with respect to the cladding portion 12. The diameter (core diameter) of the cores 11a or the cores 11b is 2a, and the relative refractive-index difference of the cores 11a or the cores 11b with respect to the cladding portion 12 is Δ1. Parameters for specifying the step-index refractive index profile (hereinafter referred to as profile parameters, as appropriate) are a and Δ1.

While the refractive index profile of the cores 11a or the cores 11b is sometimes of step-index type having a shape that is geometrically ideal, the refractive index profile thereof has a top shape that is not flat but uneven due to a manufacturing characteristic or having a shape trailing from the top to the bottom at other times. In this case, at least a part of values (such as the mean value, the maximum value, and the minimum value in the top region that determine Δ1) of the top of the refractive index profile within a range of a core diameter 2a serves as an index for determining Δ1. The same holds true for Δ1 in the case of trench-index type below.

Figure 3:
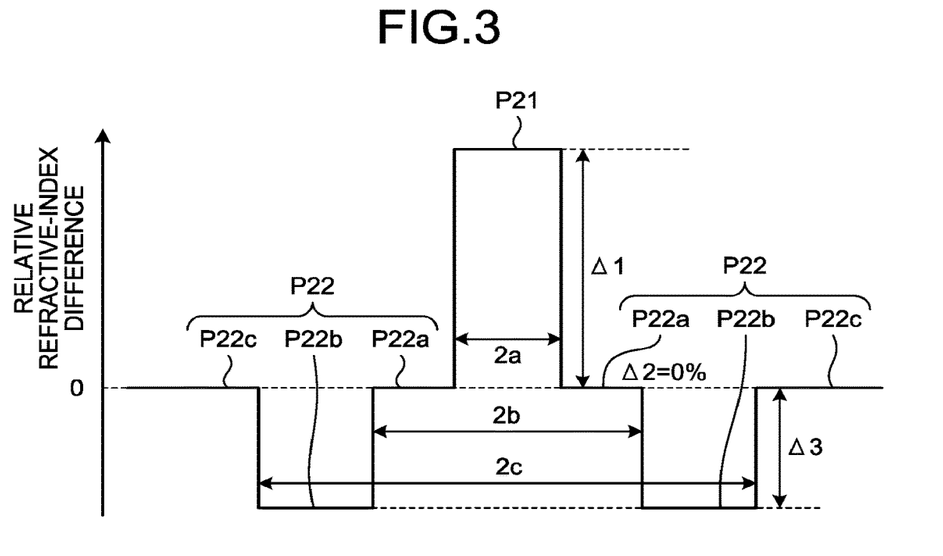
FIG. 3 is a view illustrating a trench-index profile that is an example of a refractive index profile.

FIG. 3 is a view illustrating a trench-index refractive index profile in the radial direction from the central axes of the cores. In FIG. 3, a profile P21 illustrates the refractive index profile of the cores 11a or the cores 11b, and a profile P22 illustrates the refractive index profile of the cladding portion 12.

As the profile P22 illustrates, the cladding portion 12 includes three regions having profiles P22a, P22b, P22c. The profile P22a is a refractive index profile of an adjacent region surrounding the outer peripheries of the cores 11a or the cores 11b, and the adjacent region is made of pure silica glass. The profile P22b is a refractive index profile of a trench layer surrounding the outer periphery of the adjacent region. The trench layer is a region with which dopant for decreasing the refractive index, such as fluorine (F). The profile P22c is a refractive index profile of a reference refractive index region surrounding the outer periphery of the trench region. The reference refractive index region is made of pure silica glass.

The core diameter of the cores 11a or the cores 11b is 2a, and the relative refractive-index difference of the cores 11a or the cores 11b to the adjacent region is Δ1. The relative refractive-index difference of the adjacent region to the reference refractive index region is Δ2 and is 0% in the present embodiment. The relative refractive-index difference of the trench layer to the reference refractive index region is Δ3. The outside diameter of the adjacent region, in other words, the inside diameter of the trench layer is 2b, and the outside diameter of the trench layer is 2c. Thus, the profile parameters for the trench-index refractive index profile are a, b, c, Δ1, and Δ3. In the case of a=b, no adjacent region is present, thereby providing what is called a W-shaped refractive index profile. In the present specification, W type is to be included in a trench-index type.

Preferred structural parameters for the multi-core fiber 10 will be described next. First, the outside diameter (cladding diameter) of the cladding portion 12 in the multi-core fiber 10 is preferably 125 μm. If the outside diameter thereof is 125 μm, the multi-core fiber 10 is versatile, and a complication can be prevented, such as a need to prepare a new connecting tool for connection to other optical elements, for example, another multi-core fiber 10 and an optical part.

Subsequently, preferred cladding thicknesses in the multi-core fiber 10 will be described. The cladding thicknesses refer to respective thicknesses of the cladding portion 12 surrounding the cores 11a, 11b. Because the cores 11a, 11b are eccentric to the center of the cladding portion 12, the cladding thickness varies with their directions. For this reason, as indicated by a distance t in FIG. 1, the shortest distance from the outer peripheral surface of the cores 11b to the outer peripheral surface of the cladding portion 12 is to be the minimum cladding thickness. Likewise, the minimum cladding thickness is also specified for the cores 11a.

The minimum cladding thicknesses affect the cut-off wavelength in the cores. For this reason, in a single-core fiber in which a core is arranged at the center of a cladding portion, computer simulations of the cut-off wavelength λcc and the minimum cladding thickness (required cladding thickness) necessary to achieve the cut-off wavelength were performed in a case in which the core diameter 2a was changed in various ways relative to a refractive index profile (step-index type and trench-index type) conforming to G.652 standard or G.657A standard.

Figure 4:
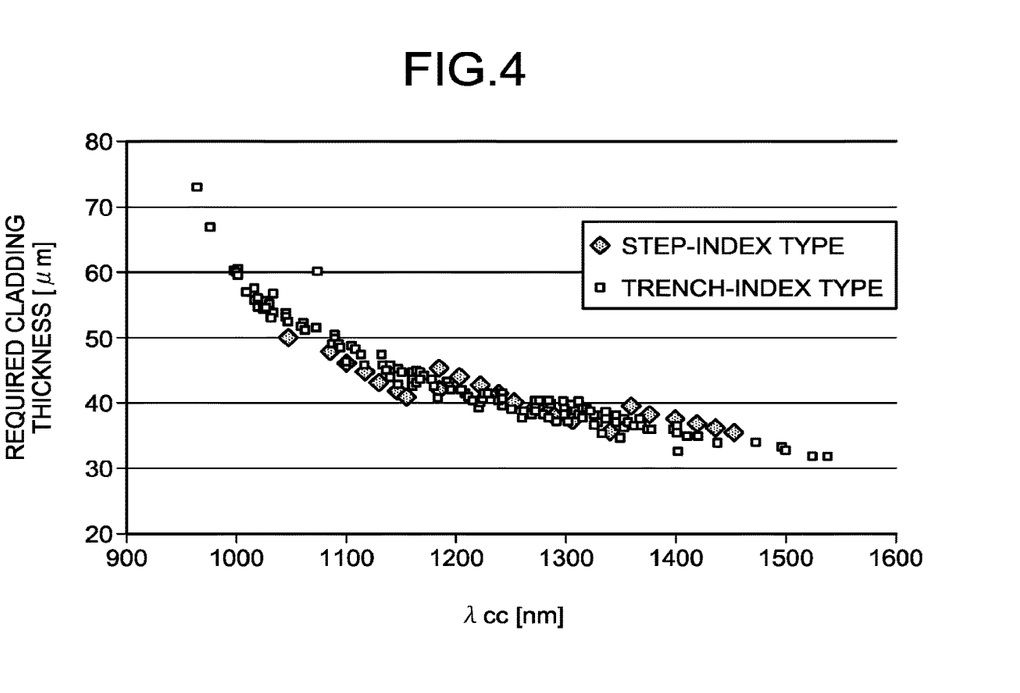
FIG. 4 is a view illustrating the relation between λcc and the required cladding thickness.

FIG. 4 is a view illustrating the relation between λcc and the required cladding thickness. It was found that, in both step-index type and trench-index type, as λcc increases, the required cladding thickness decreases. Additionally, as is evident from FIG. 4, the required cladding thickness of the multi-core fiber 10 is preferably equal to or greater than 30 μm.

Figure 5:
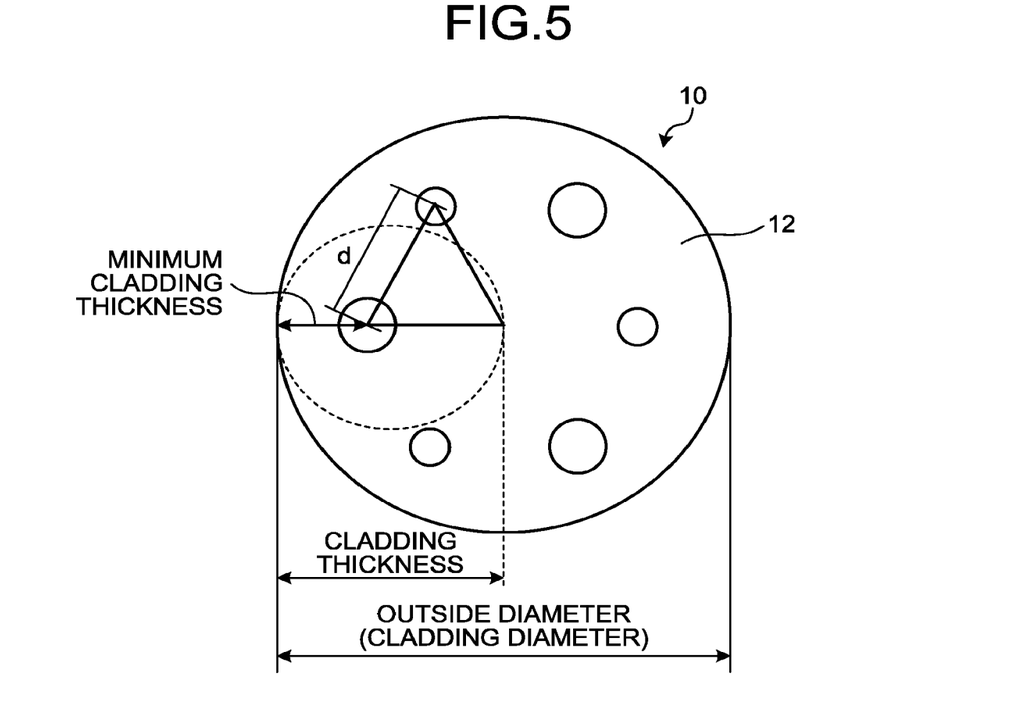
FIG. 5 is a view illustrating the outside diameter (cladding diameter) of the multi-core fiber, the cladding thickness, the minimum cladding thickness, and the distance between cores that are closest to each other.

Meanwhile, considering that the cladding diameter of the multi-core fiber 10 is to be 125 μm, the cladding thickness is preferably equal to or less than 50 μm, so that the cladding thickness is preferably in the range from 30 μm to 50 μm. FIG. 5 is a view illustrating the outside diameter (cladding diameter) of the multi-core fiber 10, the cladding thickness, the minimum cladding thickness, and the distance (pitch) d between cores that are closest to each other. In the multi-core fiber 10, given that the minimum cladding thickness is to be 50 μm, if the distance d between the cores 11a, 11b that are closest to each other is to be 12.5 μm, the cladding diameter can be 125 μm while crosstalk of light between the cores closest to each other is kept equal to or less than −30 dB per a length of 100 m. Given that the minimum cladding thickness is to be 30 μm, if the distance d between the cores are closest to each other is to be 32.5 μm, the cladding diameter can be 125 μm while the crosstalk is kept equal to or less than −30 dB per a length of 100 m. Consequently, the distance d is preferably in the range from 12.5 μm to 32.5 μm.

Subsequently, a concrete example of a preferred refractive index profile in the multi-core fiber 10 will be described. Table 3 illustrates profile parameters and propagation refractive indexes conforming to G.652 standard or G.657A standard. The propagation refractive indexes are obtained by computer simulations using the profile parameters. Also, b and c, which are the parameters for the trench-index type, are expressed as b/a and c/a that have been normalized by a.

Table 4 illustrates optical propagation characteristics obtained by computer simulations using the parameters shown in Table 3, as well as G.652A standard and G.657A2 standard. Note that (≤50 μm) in the cladding thickness indicates a preferred range of cladding thickness so that the cladding diameter can be 125 μm. As shown in Table 4, the step-index type obtained the propagation characteristics conforming to G.652A standard and a cladding thickness of 40 μm. Also, the trench-index type obtained the propagation characteristics conforming to G.657A2 standard and a cladding thickness of 39 μm. Herein, for the cladding thickness, bringing the cores into conformity with G.652 standard or G.657A standard generally constitutes a limiting factor, and, in particular, the cut-off wavelength constitutes a limiting factor. Thus, as in Table 4, setting the cut-off wavelength at a value as close to the upper limit as possible enables the cladding thickness to be small, which is preferable. Note that "E" in the table indicates a power of 10, and that 5.3E-3 means $5.3 \times 10^{-3}$, for example. The same holds true for the following tables.

TABLE 3

| Item | Δ1 | Δ3 | b/a | c/a | 2a | Propagation refractive index |
|---|---|---|---|---|---|---|
| Unit | [%] | [%] | | | [μm] | |
| Step-index type | 0.37 | — | — | — | 9.0 | 1.44701 |
| Trench-index type | 0.36 | −0.60 | 3 | 4 | 8.0 | 1.44654 |

TABLE 4

| Item | Zero-dispersion wavelength | Dispersion slope | MFD | λcc | Macrobending loss | Cladding thickness |
|---|---|---|---|---|---|---|
| Unit | [nm] | [ps/nm$^2$/km] | [μm] @ 1310 nm | [nm] @ 22 m | [dB/m] @ 1550 nm | [μm] |
| G.652 A standard | 1300-1324 | ≤0.092 | 8.6-9.5 | ≤1260 | ≤5.3E−3 @ 30 nm | (≤50) |
| G.657 A2 standard | 1300-1324 | ≤0.092 | 8.6-9.2 | ≤1260 | ≤1.59 @ 10 nm | (≤50) |
| Step-index type | 1304 | 0.090 | 9.1 | 1254 | 0.3E−7 @ 30 nm | 40 |
| Trench-index type | 1317 | 0.088 | 8.8 | 1252 | 0.26 @ 10 nm | 39 |

Table 5 illustrates profile parameters and propagation refractive indexes conforming to G.654 standard. Table 6 illustrates optical propagation characteristics obtained by computer simulations using the parameters shown in Table 5, as well as G.654A/C, G.654B, and G.654D standards. As shown in Table 6, the step-index type obtained the propagation characteristics conforming to G.654B standard and a cladding thickness of 37 μm. Also, the trench-index type obtained the propagation characteristics conforming to G.654A/C and G.654B standards and a cladding thickness of 33 μm.

TABLE 5

| Item | Δ1 | Δ3 | b/a | c/a | 2a | Propagation refractive index |
|---|---|---|---|---|---|---|
| Unit | [%] | [%] | | | [μm] | |
| Step-index type | 0.37 | — | — | — | 10.5 | 1.44749 |
| Trench-index type | 0.36 | −0.60 | 3 | 4 | 9.5 | 1.44710 |

TABLE 6

| Item | Chromatic dispersion | Dispersion slope | MFD | λcc | Macrobending loss | Cladding thickness |
|---|---|---|---|---|---|---|
| Unit | [ps/nm/km] @ 1550 nm | [ps/nm$^2$/km] | [μm] @ 1550 nm | [nm] @ 22 m | [dB/m] @ 30 nm @ 1625 nm | [μm] |
| G.654 A/C standard | ≤20 | ≤0.070 | 9.5-10.5 | ≤1530 | ≤0.0265 | (≤50) |

TABLE 6-continued

| Item | Chromatic dispersion | Dispersion slope | MFD | λcc | Macrobending loss | Cladding thickness |
|---|---|---|---|---|---|---|
| G.654 B standard | ≤22 | ≤0.070 | 9.5-13.0 | ≤1530 | ≤0.0265 | (≤50) |
| G.654 D standard | ≤23 | ≤0.070 | 11.5-15.0 | ≤1530 | ≤0.106 | (≤50) |
| Step-index type | 19.4 | 0.062 | 10.70 | 1472 | 1.1E−8 | 37 |
| Trench-index type | 18.7 | 0.061 | 10.43 | 1495 | 5.5E−8 | 33 |

The multi-core fiber 10 can therefore be implemented by applying any one of the refractive index profiles in Table 3 to the cores 11a and applying any one of the refractive index profiles in Table 5 to the cores 11b. A difference in propagation refractive index between the cores 11a, 11b of the multi-core fiber 10 thus implemented is 0.00048 in a case in which both are of step-index type, and is 0.00056 in a case in which both are of trench-index type. The values are sufficiently large as heterogeneous cores.

Incidentally, the profile parameters shown in Table 3 and Table 5 are compared. For the step-index type, Δ1 has the same value, which is 0.37 in both tables, and 2a has values different from each other, which are 9.0 μm and 10.5 μm in Table 3 and Table 5, respectively. Likewise, For the trench-index type, Δ1, Δ3, b/a, and c/a all have the same values, which are 0.36%, −0.60%, 3, and 4, respectively, in both tables, and 2a has values different from each other, which are 8.0 μm and 9.5 μm in Table 3 and Table 5, respectively.

This means that, in a case in which the types of refractive index profile are the same, the profile parameters conforming to G.654 standard and the profile parameters conforming to G.652 standard or G.657A standard can be achieved by making the profile parameters equal to each other except for the core diameters. Consequently, when the multi-core fiber 10 is manufactured, a core preform for fabricating the cores conforming to one of the standards can first be prepared, and, by stretching this core preform, for example, the core diameter can be changed to prepare a core preform for manufacturing the cores conforming to the other standard, thereby improving manufacturability. The details thereof will be described later.

Manufacturing Method

Figure 6:
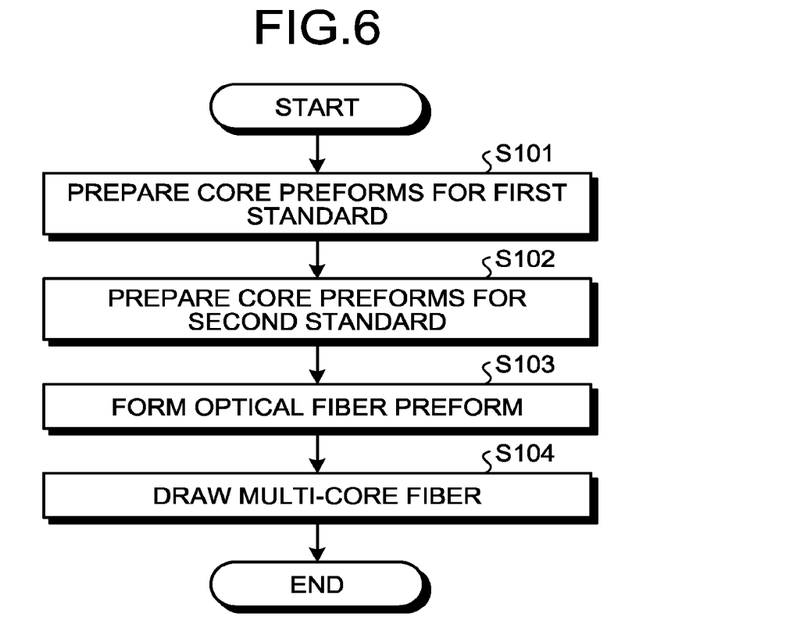
FIG. 6 is a diagram illustrating an example of a flow of manufacturing the multi-core fiber.

An example of a method of manufacturing the multi-core fiber 10 will be described next with reference to a manufacturing flow in FIG. 6. First, three core preforms for a first standard are prepared at Step S101. The core preforms are used to fabricate cores that have the propagation characteristics conforming to G.654 standard, and includes a core and a cladding portion.

Subsequently, three core preforms for a second standard are prepared at Step S102. The core preforms are used to fabricate cores that have the propagation characteristics conforming to G.652 standard or G.657A standard, and includes a core and a cladding portion. The core preforms for the first and the second standards can be fabricated by combining the publicly known vapor axial deposition (VAD) and outside vapor deposition (OVD) methods.

Subsequently, an optical fiber preform is fabricated by using the three core preforms for the first standard and the three core preforms for the second standard at Step S103. The optical fiber preform can be fabricated by using the publicly known stack and draw or drilling method.

Subsequently, the multi-core fiber 10 is fabricated by drawing the optical fiber preform at Step S104. In this manner, the multi-core fiber 10 can be manufactured.

Incidentally, as described above, in a case in which the types of refractive index profile are the same, the profile parameters conforming to G.654 standard and the profile parameters conforming to G.652 standard or G.657A standard can be achieved by making the profile parameters equal to each other except for the core diameters. Thus, a preparation process of core preforms at Steps S101, S102 mentioned above can be performed as an example illustrated in FIG. 7.

Figure 7:
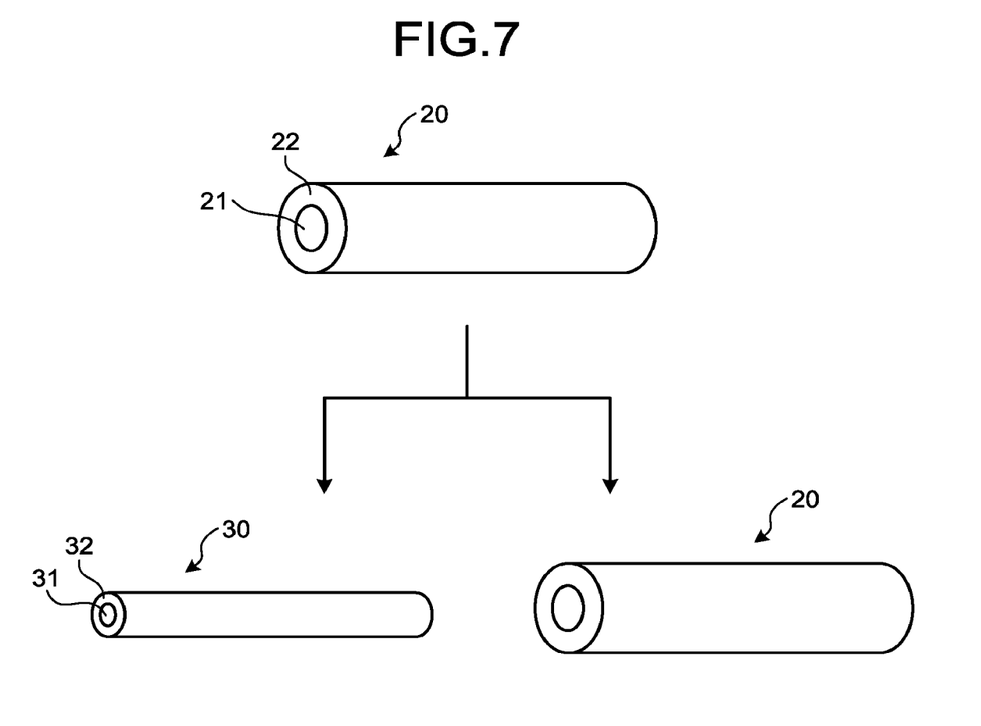
FIG. 7 is a diagram illustrating an example of a preparation process of core preforms.

That is, as core preforms for the first standard, six core preforms 20 for the first standard are first fabricated that includes a core 21 and a cladding portion 22. Subsequently, while three core preforms 20 for the first standard are left untouched, the other three core preforms 20 for the first standard are heated and stretched by using flames or an electric furnace, core preforms 30 for the second standard are fabricated that includes a core 31 and a cladding portion 32. At this time, in the case of trench-index type, for example, when the core preforms 20 for the first standard are heated and stretched, the core diameter thereof alone can be changed while the values of Δ1, Δ3, b/a, and c/a are kept, so that the core preforms 30 for the second standard can be fabricated by heating and stretching the core preforms 20 for the first standard. In this manner, core preforms conforming to standards different from each other are not manufactured separately, but a part of the manufacturing process can be standardized, thereby improving manufacturability.

Subsequently, an example of a fabricating process of an optical fiber preform using the core preforms 20 for the first standard and the core preforms 30 for the second standard that have been prepared as in FIG. 7.

Figure 8:
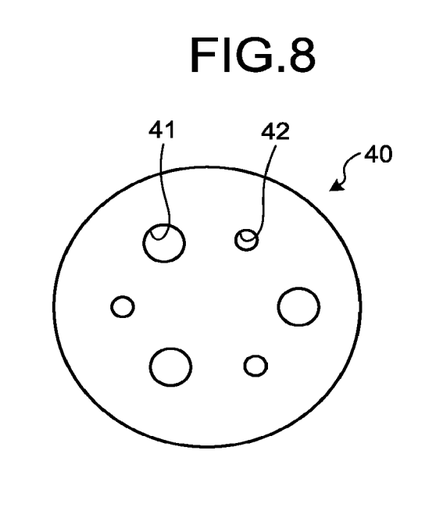
FIG. 8 is a diagram illustrating an example of a fabricating process of an optical fiber preform.

As illustrated in FIG. 8, three first holes 41 and three second holes 42 are first drilled in a cylindrical glass rod 40 made of pure silica glass, in parallel with the central axis thereof. The first holes 41 each have such an inside diameter as to accommodate the outside diameter of the core preforms 20 for the first standard. The second holes 42 each have such an inside diameter as to accommodate the outside diameter of the core preforms 30 for the second standard, and have an inside diameter smaller than that of the first holes 41. The first holes 41 and the second holes 42 are arrayed in a regular hexagonal shape so as to be the array of the cores 11a, 11b of the multi-core fiber 10.

Figure 9:
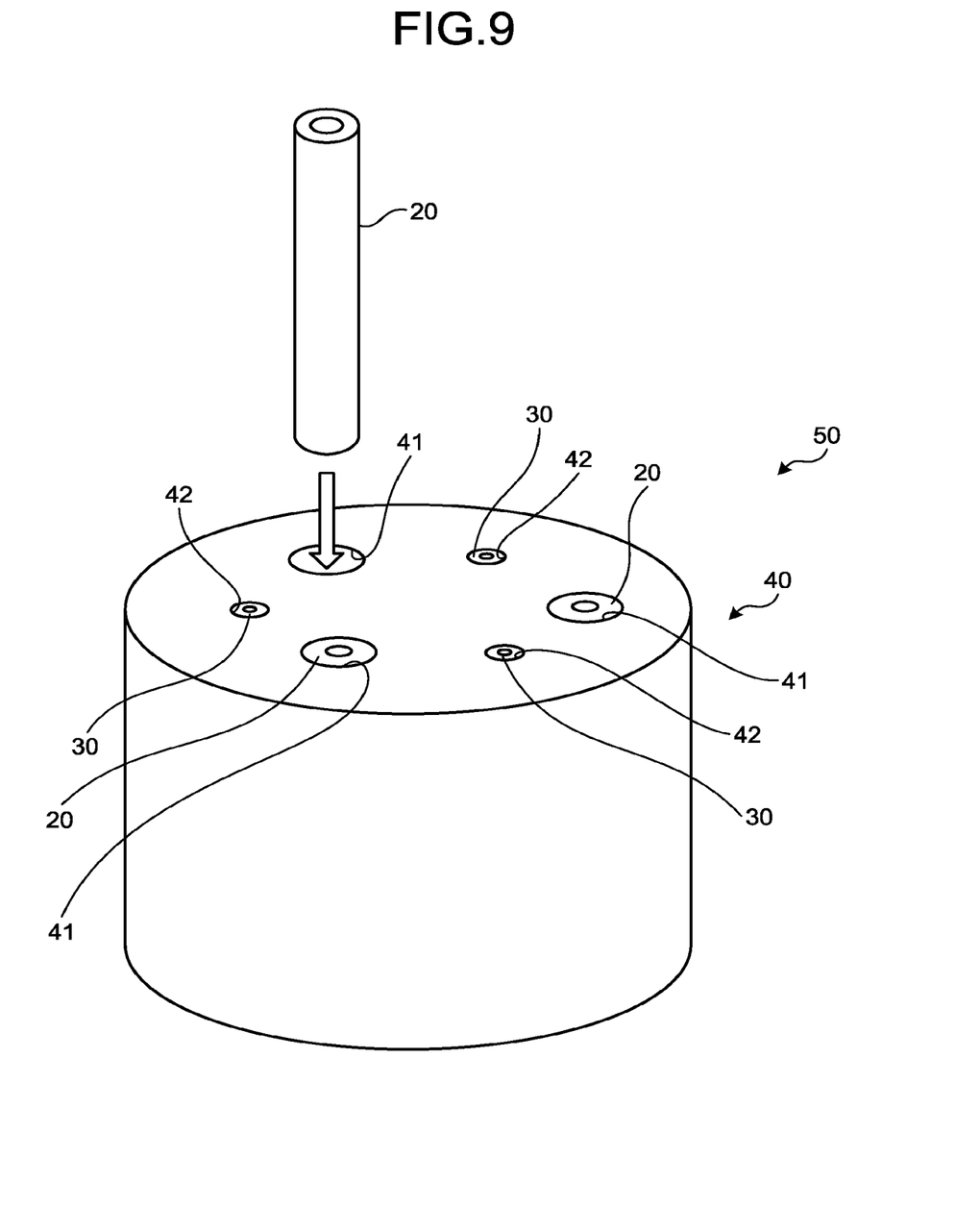
FIG. 9 is a diagram illustrating an example of a fabricating process of an optical fiber preform.

Subsequently, as illustrated in FIG. 9, the core preforms 20 for the first standard and the core preforms 30 for the second standard are respectively inserted into the first holes 41 and the second holes 42 of the glass rod 40. The glass rod 40, and the core preforms 20 for the first standard and the core preforms 30 for the second standard are then heated to be integral with each other, so that an optical fiber preform is fabricated. Optical fiber preforms thus fabricated are drawn, whereby the multi-core fiber 10 can be manufactured.

Integrating the glass rod 40, the core preforms 20 for the first standard, and the core preforms 30 for the second standard by heating is not necessarily performed in the fabricating process of an optical fiber preform, and may be performed by heating for drawing in a fabricating process of a multi-core fiber.

Second Embodiment

Figure 10:
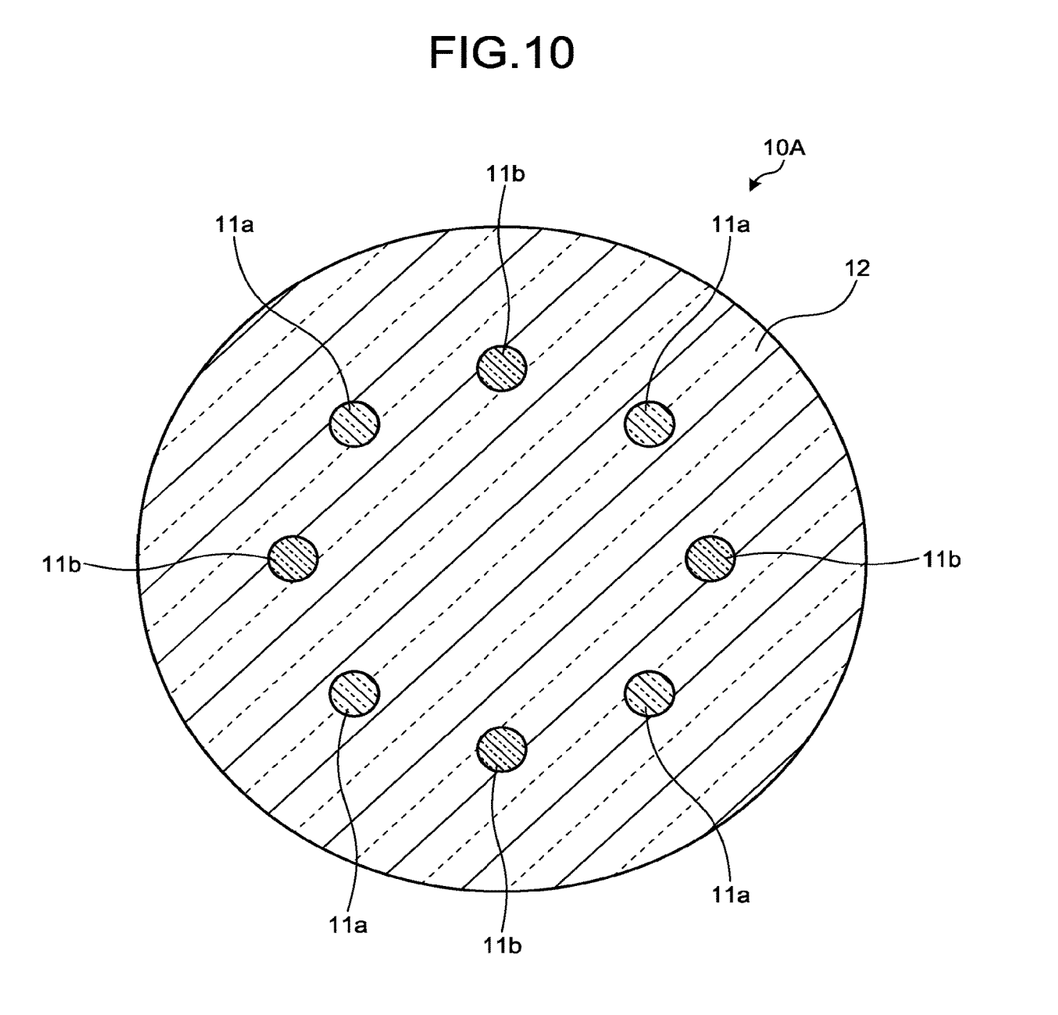
FIG. 10 is a schematic cross-sectional diagram of a multi-core fiber according to a second embodiment.

FIG. 10 is a schematic cross-sectional diagram perpendicular to the longitudinal direction of a multi-core fiber according to a second embodiment. A multi-core fiber 10A includes, as a plurality of, specifically, eight cores, four cores 11a and four cores 11b. The multi-core fiber 10A also includes the cladding portion 12 formed around the outer peripheries of the cores 11a, 11b.

The cores 11a, 11b and the cladding portion 12 are the same as the corresponding components in the multi-core fiber 10, and description is thus omitted of the constituent materials, the refractive index profiles, and the standards to which the propagation characteristics conform.

The cores 11a, 11b are arrayed alternately in an annular shape. The cores 11a, 11b can be said to be arrayed in a regular octagonal shape. As a result, cores closest to a core 11a are the cores 11h, and cores closest to a core 11b are the cores 11a. In this manner, cores that are closest to each other conform to standards different from each other, so that the multi-core fiber 10A is versatile as with the multi-core fiber 10, the pitch can be decreased, and the space density can be increased.

Third Embodiment

Figure 11:
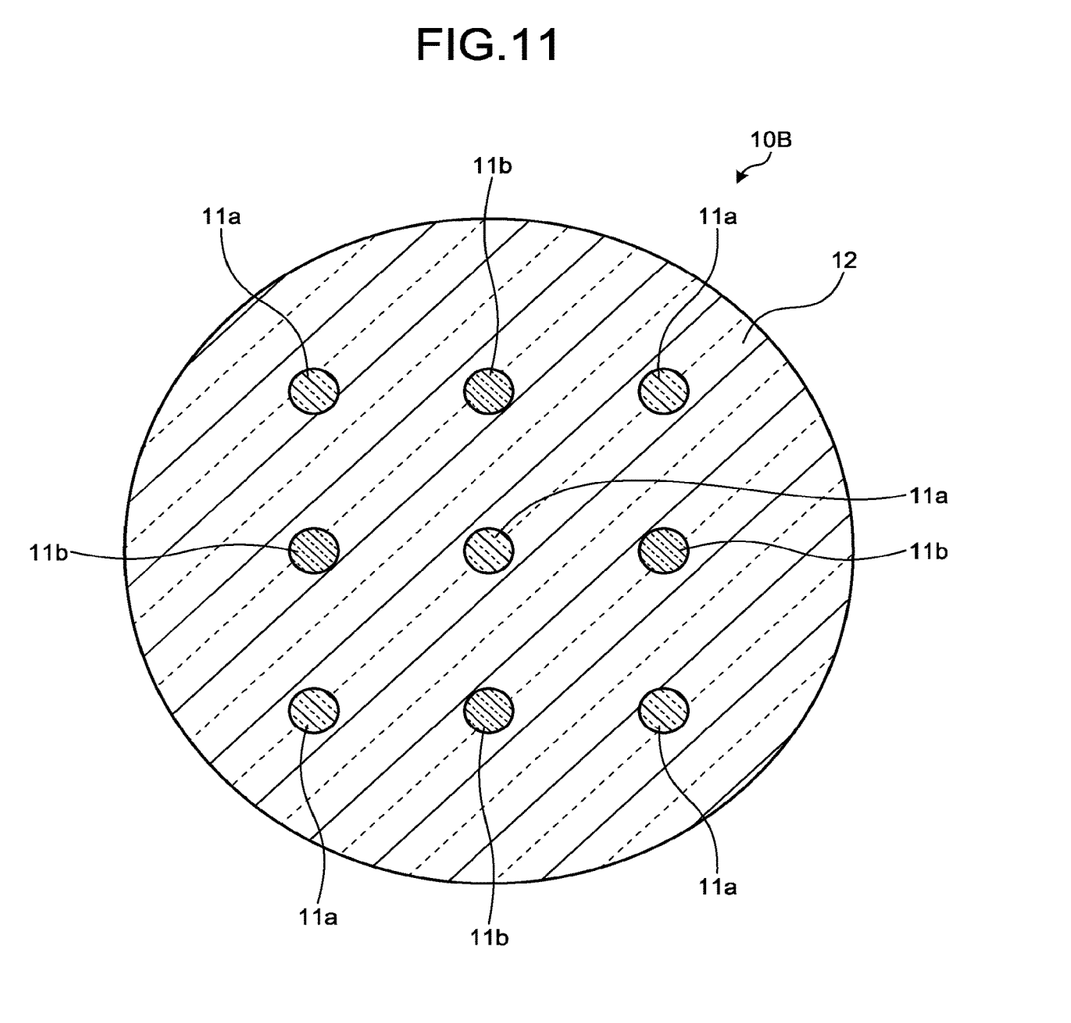
FIG. 11 is a schematic cross-sectional diagram of a multi-core fiber according to a third embodiment.

FIG. 11 is a schematic cross-sectional diagram perpendicular to the longitudinal direction of a multi-core fiber according to a third embodiment. A multi-core fiber 10B includes, as a plurality of, specifically, nine cores, five cores 11a and four cores 11b. The state of the multi-core fiber 10B also includes the cladding portion 12 formed around the outer peripheries of the cores 11a, 11b.

The cores 11a, 11b and the cladding portion 12 are the same as the corresponding components in the multi-core fiber 10, and description is thus omitted of the constituent materials, the refractive index profiles, and the standards to which the propagation characteristics conform.

The cores 11a, 11b are arrayed alternately in a tetragonal lattice shape. As a result, cores closest to a core 11a are the cores 11b, and cores closest to a core 11b are the cores 11a. In this manner, cores that are closest to each other conform to standards different from each other, so that the multi-core fiber 10B is versatile as with the multi-core fiber 10, the pitch can be decreased, and the space density can be increased.

Furthermore, the array of the cores in the multi-core fibers according to the present disclosure is not limited to the triangular lattice shape, the annular shape, and the tetragonal lattice shape mentioned above as long as the array is such that cores that are closest to each other conform to standards different from each other, and the cores may be arrayed in various ways.

Fourth Embodiment

Figure 12:
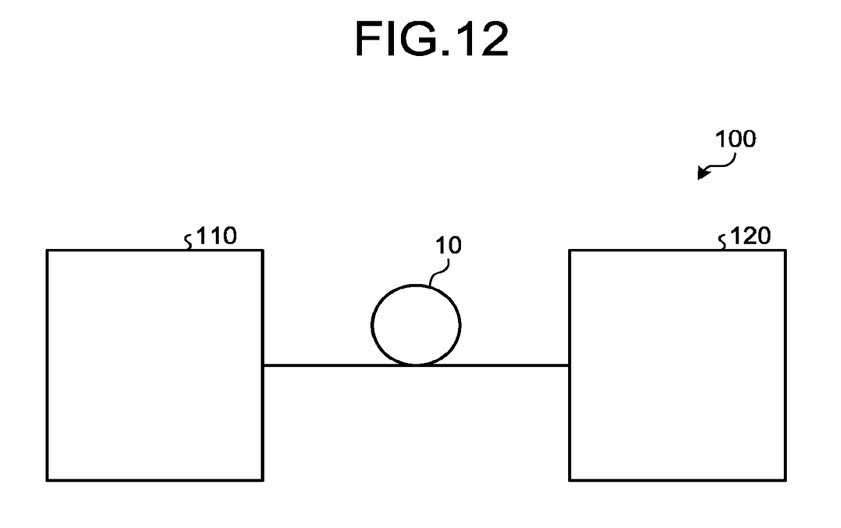
FIG. 12 is a schematic configuration diagram of an optical transmission system according to a fourth embodiment.

FIG. 12 is a schematic configuration diagram of an optical transmission system according to a fourth embodiment. This optical transmission system 100 includes an optical transmission device 110, an optical reception device 120, and the multi-core fiber 10 according to the first embodiment.

The optical transmission device 110 includes six optical transmitters having a light source, such as a semiconductor laser, and an optical input unit. The optical transmitters each output a signal light beam that has a wavelength included in a wavelength band in use and that has been modulated by a modulating signal. The wavelength band in use is a wavelength band to be used for optical fiber communications, and is not particularly limited.

The optical input unit is configured by including publicly known fan-in, and inputs, to the cores 11a, 11b of the multi-core fiber 10, the six signal light beams that have been output from the optical transmitters. In this manner, the cores 11a, 11b propagate the six signal light beams.

The optical reception device 120 includes six optical receivers having a photoreceptor, such as a photodiode, and an optical output unit.

The optical output unit is configured by including publicly known fan-out, and extracts and outputs the six signal light beams that have been transmitted by the cores 11a, 11b. The optical receivers receive the respective signal light beams that have been output, and demodulate the modulating signals included in the signal light beams.

This optical transmission system 100 can have the versatility of use and the effect of increasing the space density because the optical transmission system 100 uses the multi-core fiber 10 according to the first embodiment as an optical transmission fiber.

The optical transmission system 100 can be used to practice various optical transmission methods.

For example, the optical transmission system 100 can be used to make coarse wavelength division multiplexing (CWDM) optical transmission and dense WDM (DWDM) optical transmission simultaneously. Herein, the CWDM optical transmission refers to optical transmission that uses CWDM signals obtained by wavelength multiplexing a plurality of signal light beams having a wavelength of equal to or greater than 1260 nm. The CWDM signal light beams are obtained by arraying signal light beams at intervals of 20 nm in a wavelength band from 1271 nm to 1611 nm, for example. The DWDM optical transmission refers to optical transmission that uses DWDM signals obtained by wavelength multiplexing a plurality of signal light beams having a wavelength of equal to or greater than 1530 nm. The DWDM signal light beams are obtained by arraying signal light beams at intervals of 100 GHz, 200 GHz or the like in a wavelength band from approximately 1530 nm to approximately 1624 nm, for example.

In this case, the optical transmission device 110 inputs the CWDM signal light beams to the cores 11a of the multi-core fiber 10. The optical transmission device 110 also inputs the DWDM signal light beams to the cores 11b. For the cores 11a that have the propagation characteristics conforming to G.652 standard or G.657A standard, the CWDM signal light beams can be propagated in a single mode, and for the cores 11b that have the propagation characteristics conforming to G.654 standard, the DWDM signal light beams can be propagated in a single mode. Additionally, a core 11a and a core 11b that are closest to each other have wavelength bands of WDM signals to be transmitted different from each other, which can prevent interference between the WDM signals.

Fifth Embodiment

Figure 13:
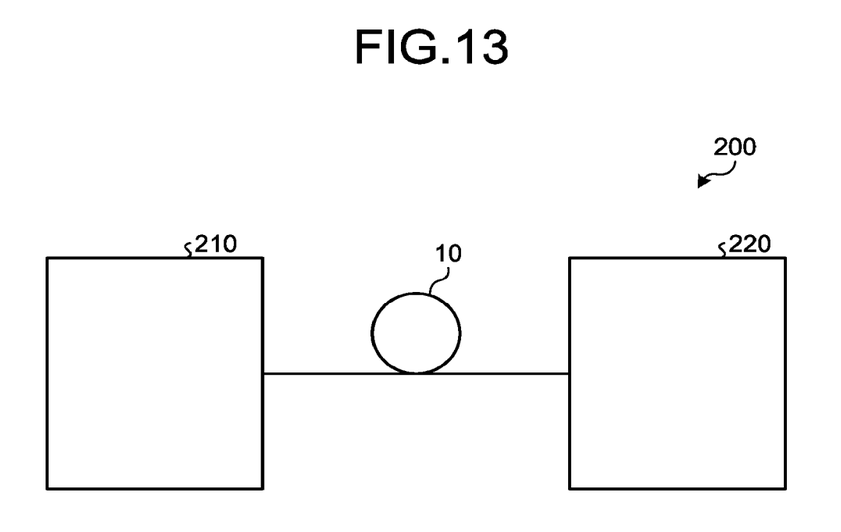
FIG. 13 is a schematic configuration diagram of an optical transmission system according to a fifth embodiment.

FIG. 13 is a schematic configuration diagram of an optical transmission system according to a fifth embodiment. This optical transmission system 200 includes an optical transmission and reception device 210, an optical transmission and reception device 220, and the multi-core fiber 10 according to the first embodiment.

The optical transmission and reception devices 210, 220 are configured so as to be able to achieve bidirectional transmission. The optical transmission and reception devices 210, 220 each include six optical transmitters, six optical receivers, and an optical input and output unit. The optical transmitters each output a signal light beam that has a wavelength included in a wavelength band in use and that has been modulated by a modulating signal. The wavelength band in use is a wavelength band to be used for optical fiber communications, and is not particularly limited.

The optical input and output unit includes publicly known fan-in and an optical multiplexer/demultiplexer. This fan-in functions as fan-out as well.

In each of the optical transmission and reception devices 210, 220, the optical input and output unit inputs, to the cores 11a, 11b of the multi-core fiber 10, the six signal light beams that have been output from the optical transmitters. In this manner, the cores 11a, 11b propagate the six signal light beams. Meanwhile, in each of the optical transmission and reception devices 210, 220, the optical input and output unit extracts and outputs the six signal light beams that have been transmitted from the other optical transmission and reception device via the cores 11a, 11b. The optical receivers receive the respective signal light beams that have been output, and demodulate the modulating signals included in the signal light beams.

This optical transmission system 200 can achieve bidirectional transmission, and can also have the versatility of use and the effect of increasing the space density because the optical transmission system 100 uses the multi-core fiber 10 according to the first embodiment as an optical transmission fiber. Additionally, interference of signal light beams in bidirectional transmission can be prevented by varying directions of optical transmission between a core 11a and a core 11b that are closest to each other.

In the optical transmission systems according to the embodiments mentioned above, all of the cores 11a, 11b of the multi-core fiber 10 are used to make optical transmission, but at least one of the cores 11a, 11b may be used to make optical transmission.

In order to identify the cores, a publicly known marker may be provided to the multi-core fibers according to the embodiments mentioned above. Such a marker can be implemented by providing, in the cladding portion, for example, a region having a refractive index different from that of the cladding portion.

The embodiments mentioned above do not limit the present disclosure. The present disclosure also includes any disclosure that is constituted by combining the components described above, as appropriate. A person skilled in the art can easily derive further effects and modifications. There-fore, a wider range of aspects of the present disclosure is not limited by the embodiments mentioned above, and various changes can be made.

As described above, multi-core fibers and a method of manufacturing the same, and an optical transmission system and an optical transmission method according to the present disclosure are useful for a multi-core fiber that uses a plurality of heterogeneous cores.

According to the present disclosure, the effect is exerted of being able to implement multi-core fibers that are versatile and in which the space density can be increased.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A multi-core fiber comprising:
a plurality of cores; and
a cladding portion formed around outer peripheries of the plurality of cores,
wherein the plurality of cores each have a propagation characteristic conforming to any one of a plurality of standards for optical propagation characteristics, and of the plurality of cores, cores that are closest to each other conform to standards different from each other,
wherein the standards include ITU-T G.652 standard, G.657A standard, and G.654 standard, and
wherein, of the plurality of cores that are closest to each other, a first core has a propagation characteristic conforming to G.652 standard or G.657A standard, and a second core has a propagation characteristic conforming to G.654 standard.

2. The multi-core fiber according to claim 1, wherein the propagation characteristic is at least one of a cut-off wavelength, a mode field diameter, a macrobending loss, and a chromatic dispersion characteristic.

3. The multi-core fiber according to claim 2, wherein the first core and the cladding portion, and the second core and the cladding portion have parameters for specifying a refractive index profile equal to each other except for a core diameter.

4. The multi-core fiber according to claim 3, wherein the refractive index profiles comprise a step-index type or a trench-index type.

5. The multi-core fiber according to claim 1, wherein a cladding thickness is in a range from 30 μm to 50 μm.

6. The multi-core fiber according to claim 1, wherein a distance between the cores that are closest to each other is in a range from 12.5 μm to 32.5 μm.

7. An optical transmission system comprising:
the multi-core fiber according to claim 1;
an optical transmission device configured to input a signal light beam into at least one of the plurality of cores of the multi-core fiber; and
an optical reception device configured to receive the signal light beam propagated through the multi-core fiber.

8. An optical transmission system comprising:
a multi-core fiber comprising:
a plurality of cores, and
a cladding portion formed around outer peripheries of the plurality of cores, wherein the plurality of cores each have a propagation characteristic conforming to any one of a plurality of standards for optical propagation characteristics, and of the plurality of cores, cores that are closest to each other conform to standards different from each other;

an optical transmission device configured to input a signal light beam into at least one of the plurality of cores of the multi-core fiber; and an optical reception device configured to receive the signal light beam propagated through the multi-core fiber, wherein the optical transmission device inputs, to a core that has a propagation characteristic conforming to G.652 standard or G.657A standard, a CWDM signal obtained by wavelength multiplexing a plurality of signal light beams having a wavelength of equal to or greater than 1260 nm, and inputs, to a core that has a propagation characteristic conforming to G.654 standard, a DWDM signal obtained by wavelength multiplexing a plurality of signal light beams having a wavelength of equal to or greater than 1530 nm.

9. An optical transmission system comprising:

a multi-core fiber comprising:
   a plurality of cores, and
   a cladding portion formed around outer peripheries of the plurality of cores, wherein the plurality of cores each have a propagation characteristic conforming to any one of a plurality of standards for optical propagation characteristics, and of the plurality of cores, cores that are closest to each other conform to standards different from each other;

an optical transmission device configured to input a signal light beam into at least one of the plurality of cores of the multi-core fiber; and an optical reception device configured to receive the signal light beam propagated through the multi-core fiber, wherein the optical transmission device and the optical reception device are configured to be capable of making bidirectional transmission, wherein the standards include ITU-T G.652 standard, G.657A standard, and G.654 standard, and wherein, of the plurality of cores that are closest to each other, a first core has a propagation characteristic conforming to G.652 standard or G.657A standard, and a second core has a propagation characteristic conforming to G.654 standard.

10. An optical transmission method using the optical transmission system as in claim 7, wherein, by using a core that has a propagation characteristic conforming to G.652 standard or G.657A standard, CWDM optical transmission is made that uses a CWDM signal light beam obtained by wavelength multiplexing a plurality of signal light beams having a wavelength of equal to or greater than 1260 nm, and, by using a core that has a propagation characteristic conforming to G.654 standard, DWDM optical transmission is made that uses a DWDM signal light beam obtained by wavelength multiplexing a plurality of signal light beams having a wavelength of equal to or greater than 1530 nm.

11. An optical transmission method using the optical transmission system as in claim 7, wherein bidirectional transmission is made.

* * * * *